Oct. 8, 1968

K. L. BROWN

3,405,363

METHOD OF AND APPARATUS FOR DEFLECTING
BEAMS OF CHARGED PARTICLES

Filed Jan. 22, 1962

INVENTOR.
KARL L. BROWN

BY Paul B. Fike

PATENT AGENT

Fig_6

Fig_7A

Fig_7B

INVENTOR.
KARL L. BROWN

BY Paul B. Filie

PATENT AGENT

Oct. 8, 1968  K. L. BROWN  3,405,363
METHOD OF AND APPARATUS FOR DEFLECTING
BEAMS OF CHARGED PARTICLES
Filed Jan. 22, 1962  4 Sheets-Sheet 4

*INVENTOR.*
*KARL L. BROWN*

BY

*Paul B. Fihe*

*PATENT AGENT*

United States Patent Office 3,405,363
Patented Oct. 8, 1968

3,405,363
METHOD OF AND APPARATUS FOR DEFLECTING BEAMS OF CHARGED PARTICLES
Karl L. Brown, Menlo Park, Calif., assignor, by mesne assignments, to Varian Associates, Palo Alto, Calif., a corporation of California
Filed Jan. 22, 1962, Ser. No. 167,489
20 Claims. (Cl. 328—230)

The present invention relates to the controlled deflection of charged particles, and more particularly, to methods of and apparatus for deflecting beams of charged particles wherein the individual particles have different energies.

Since charged particles traversing a deflecting magnetic or electric field are deflected an amount which is dependent not only on the strength of the field but upon the energy or momentum of each individual particle, a beam of electrons or other charged particles wherein the individual particles have differing energies will undergo momentum dispersion when traversing the field of, for example, a conventional bending magnet. Such momentum dispersion has presented a severe problem if one wishes, for example, to be able to deflect a charged particle beam to various target areas, since, almost without exception, the generated beam includes particles of differing energy or momentum. Refinements in the methods and apparatus of beam generation have resulted in smaller energy bands or spectra, but in most cases the best apparatus generates sufficient energy spreads to produce a seriously hindering momentum dispersion during the conventional deflection process.

Accordingly, it is a general object of the present invention to provide an achromatic beam deflection method and apparatus therefor, that is, a method and apparatus for deflecting a beam including particles of differing energy or momentum in a manner such that if the incident particles follow a predetermined path without any angular or positional momentum dispersion, then the deflected emergent particles will also follow a predetermined path with no positional or angular momentum dispersion regardless of the momentum of the individual particles.

More particularly, it is a feature of the invention to provide an achromatic beam deflection method wherein all the particles in the beam, regardless of their individual energies, are subjected to a series of deflecting forces in a fashion such that although the individual particles traverse variant momentum-determined paths or trajectories, if there exist zero momentum dispersion, positional or angular, in the incident or entering beam, there will also exist zero momentum dispersion in the emergent or exiting beam.

Additionally, it is a feature of the invention to provide an achromatic beam deflection method wherein the beam can be subjected to deflecting forces, either electric or magnetic, arranged in any one of a selected number of patterns so that although a variety of particle trajectories can be obtained as desired, the condition is still met that if the entering beam has zero momentum dispersion, then the beam after being subjected to the deflecting forces, will also have zero momentum dispersion.

It is yet another significant feature of the present invention to provide an achromatic beam deflection method and apparatus therefor that can be devised for the achromatic deflection of all particles regardless of their momentum from a consideration of the deflection characteristics of monoenergetic particles alone.

In accordance with one specific aspect of the present invention, it is a feature to provide an achromatic beam deflection method which will translate a beam of initially parallel particles to a final deflected beam wherein the particle trajectories are also parallel.

Additionally, it is a feature of the present invention to provide apparatus for carrying out the aforementioned achromatic beam deflection method with a series of magnetic or electric devices in a variety of arrangements to meet the particular needs of a given installation and to provide certain particular advantages.

Furthermore, it is a feature of the invention in certain instances to provide for a symmetrical arrangement of the apparatus which, in turn, results in a simplification of the design of the system and the fabrication and installation of the magnetic or electric devices utilized.

These as well as other objects and features of the invention will become more apparent from a perusal of the following description of the method and several apparatuses for carrying out such method which can be more readily explicated by reference to the accompanying drawing wherein.

Generally, the method of the present invention involves subjecting a beam of non-monoenergetic particles to a series of particle deflecting forces which, considered conjointly, are able to fulfill certain conditions that ultimately enable achromatic beam deflection to be achieved. More particularly, the conditions that must be fulfilled to provide achromatic beam deflection can be established by reference solely to the characteristics of the deflection of monoenergetic particles exposed to the deflecting forces.

Figure 1:
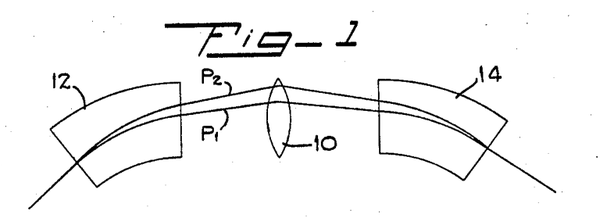
FIG. 1 is a dispersion ray diagram of the trajectories of two particles of different momentum traversing a system arranged to carry out the steps of the method of the present invention to provide achromatic beam deflection.

With initial reference to FIG. 1, the method of the present invention can be carried out by a series of three magneto-optical elements, although as will become apparent hereinafter, alternative systems utilizing magnetic or electric devices can be employed. As shown in FIG. 1, a convergent magnetic quadrupole lens 10 is appropriately positioned between two bending magnets 12 and 14. Preferably, but not necessarily, the bending magnets 12 and 14 are identical and symmetrically arranged relative to the central quadrupole lens 10, as illustrated. Additionally, as illustrated in FIG. 1, the bending magnets 12, 14 are arranged in the same sense so that the total deflection of a particle traversing the fields of the magnets will be additive.

If the quadrupole lens 10 and the bending magnets 12, 14 are of appropriate design in accordance with the conditions to be explicitly recited hereinafter, the trajectories of two particles $P_1$ and $P_2$ of different energy but entering the system along the same path will appear substantially as illustrated in FIG. 1. As the particles $P_1$ and $P_2$ traverse the field of the first bending magnet 12, momentum dispersion will occur so that the particle trajectories will diverge, the particle $P_2$ having greater energy or momentum being deflected slightly less by the bending magnet 12 than the particle $P_1$ of lesser momentum. Because of the noted momentum dispersion, the two particles $P_1$ and $P_2$ will enter the quadrupole lens 10 along divergent paths and at different transverse positions and thus be subjected to differing magnetic forces. These forces are arranged in accordance with the present invention to provide convergent trajectories of the two particles $P_1$ and $P_2$ as they emerge from the quadrupole lens 10 that are in mirror image symmetry with the entering divergent trajectories, and accordingly, provide for passage of the two particles $P_1$ and $P_2$ through the second bending magnet 14 so that the trajectories join at the point of exit therefrom. Thereafter, the two particles $P_1$ and $P_2$ follow an identical path, thus preserving the conditions of particle entry relative to momentum dispersion. In summary, a system, such as exemplified by that shown in FIG. 1, is an achromatic deflection system if non-monoenergetic particles entering with zero momentum dispersion, angular and positional, subsequently upon emergence from the system, also have zero momentum dispersion, angular and positional.

To provide an achromatic system as above defined, certain conditions must be fulfilled relative to the deflection characteristics of the system for monoenergetic particles, as previously mentioned. More particularly, monoenergetic particles entering the deflection system along parallel or divergent paths must have trajectories through the system such that the net magnetic flux enclosed by two adjacent rays or trajectories of monoenergetic particles between the entrance and exit of the system must equal zero. This condition or requirement can be met in several fashions which can be explained more clearly by reference to the radial ray diagrams of FIGS. 2A and 2B, FIGS. 3A and 3B, and FIGS. 4A and 4B, all of which pertain to the achromatic beam deflection system illustrated in FIG. 1.

Figure 2A:
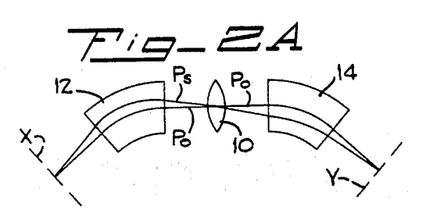
FIGS. 2A and 2B are each radial ray diagrams of the trajectories of monoenergetic particles traversing the system illustrated in FIG. 1 to assist in the explication of one manner for satisfying the conditions that must be met in order to achieve achromatic beam deflection.

With initial reference to FIG. 2A, the trajectories of two particles $P_0$ and $P_s$ having the same energy and emanating from a point source in an entrance plane X and following divergent paths into the magnet system are illustrated. The first particle $P_0$ follows the optical axis of the system which includes a central trajectory through the first bending magnet 12, through the quadrupole lens 10, and thereafter, through the second bending magnet 14. The initially divergent particle $P_s$ is arranged as a result of the design of the first bending magnet 12 to follow a trajectory which gradually becomes convergent and enters the centrally disposed quadrupole lens 10 at its optical axis so that a crossover of the trajectory of this particle $P_s$ with the trajectory of the central particle $P_0$ occurs. After such particle crossover at the quadrupole lens 10, the particle $P_s$ passes through the second bending magnet 14 to ultimately converge again on the trajectory of the central particle $P_0$ at a focal point in an exit plane Y, the two trajectories thus being anti-symmetric about the central quadrupole lens 10. As will be visually apparent by an inspection of FIG. 2A, both the particles $P_0$ and $P_s$ pass through the center of the quadrupole lens 10 so as to be generally uninfluenced thereby and the net magnetic flux enclosed in each of the bending magnets 12, 14 is equal but opposite in sign because of the central crossover of the particles so that the total magnetic flux enclosed by the adjacent rays is equal to zero. As explained in greater detail in a previous patent application, Ser. No. 106,331, filed April 28, 1961, this total flux enclosure being equal to zero is the condition that must be met in order to establish zero momentum dispersion at an image or focal point for particles emanating from a point source or object point. This condition can be expressed mathematically by:

$$\int_x^y S(t)h(t)dt = 0$$

where $t$ is the distance along the central trajectory of the particle $P_0$ from the object point in the plane X, $h(t)$ is the curvature of a particle $P_0$ on the central orbit at position $t$ and $S(t)$ is the deviation from the central orbit of a particle $P_s$ at a position $t$ and having the same momentum as the central orbit particle $P_0$ (at an object or image point, $S(t)=0$ by definition).

Since this condition for establishing zero momentum dispersion at an image point is discussed in the referred-to patent application and in yet greater detail in an article "Double Focusing Zero Dispersion Magnetic Spectrometer" in the Review of Scientific Instruments, vol. 31, No. 5, pgs. 556–564, in May of 1960, no further detailed discussion is necessary. Additionally, while in FIG. 2A, only the radial trajectories of the monoenergetic particles $P_0$ and $P_s$ are illustrated, the transverse trajectories of divergent particles can be made to meet at the same image point after traversing the system by suitable "gradient," "wedge" or "quadrupole" focusing, as explicated in the above-mentioned patent application and article. The foregoing condition relating to the trajectories of monoenergetic particles diverging from a point is the first condition that must be met by an achromatic beam deflection system in order that the final result of zero angular and positional momentum dispersion will be obtained.

Figure 2B:
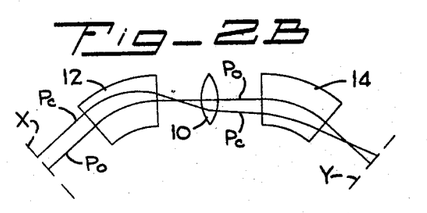

The second condition that must be met in order to achieve achromatic beam deflection relates to the trajectories of monoenergetic particles entering the system along spaced parallel paths, as illustrated in FIG. 2B. As shown, a central orbit particle $P_0$ leaves the entrance plane X and passes along a central trajectory corresponding to the optical axis of the system to the exit plane Y such trajectory being identical with that of the particle $P_0$ in FIG. 2A. A second particle $P_c$ of the same momentum enters the system in parallelism to the particle $P_0$ and is deflected by the first bending magnet 12 an amount such that its trajectory crosses that of the central-orbit particle $P_0$ prior to entrance into the quadrupole lens 10, it being remembered that the first magnet 12 in FIG. 2B is the same as magnet 12 in FIG. 2A. While the central orbit particle $P_0$ passes through the center of the quadrupole lens 10 and is uninfluenced thereby, the particle $P_c$ enters the quadrupole lens 10 at an eccentric position, and is deflected thereby to follow a less divergent trajectory. More precisely, the strength of the quadrupole lens 10 is arranged so that particle $P_c$ is deflected thereby an amount such that the total flux enclosure between the adjacent particle trajectories is again made equal to zero or in other words:

$$\int_x^y C(t)h(t)dt = 0$$

where $t$ is the distance from the entrance plane X as measured along the central orbit or trajectory of the particle $P_o$, $h(t)$ is the curvature of a particle $P_o$ on the central orbit at position $t$, and $C(t)$ is the deviation from the central orbit of a particle $P_c$ at position $t$. (At the entrance plane X, $P_c$ is parallel to the central orbit; that is the slope of $C(t)$ at $t=0$ (plane X) is zero or mathematically $$\frac{dC(t)}{dt}\bigg|_{t=0} \equiv 0$$

If both of these flux integral conditions are fulfilled so that the trajectories of monoenergetic particles appear substantially as shown in FIGS. 2A and 2B, then the trajectories of non-monoenergetic particles entering the system with zero positional and angular momentum dispersion will also exit with zero positional and angular momentum dispersion, as illustrated in FIG. 1, to thus provide an achromatic beam deflection system. For convenience, the achromatic beam translation system developed from the monoenergetic particle conditions illustrated in FIGS. 2A and 2B shall be denoted as a system which is anti-symmetric in "S" since the divergent particles $P_s$ shown in FIG. 2A crosses the trajectory of the central orbit particle $P_o$ at the axis of mirror symmetry of the system. However, it is to be understood that other monoenergetic particle trajectories can be obtained to satisfy both of the conditions for achromatic beam deflection, as hereinabove defined.

Figure 3A:
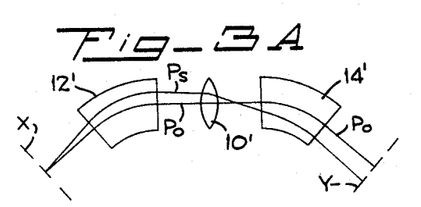
FIGS. 3A and 3B are radial ray diagrams similar to FIGS. 2A and 2B but illustrating an alternative manner of satisfying the conditions for achromatic beam deflection in the system illustrated in FIG. 1, FIGS. 4A and 4B are yet alternative radial ray diagrams of monoenergetic particle trajectories illustrating a further manner of meeting the conditions for achromatic beam deflection in the system of FIG. 1.
Figure 3B:
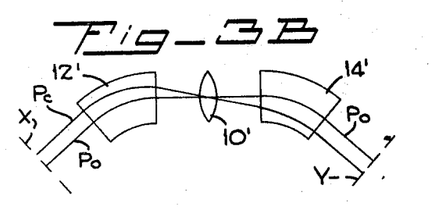

Once such alternative arrangement is illustrated in FIGS 3A and 3B and may conveniently be termed as anti-symmetric in "C." In FIG. 3A which corresponds generally to FIG. 2A, a particle $P_s$ diverges at an object point in the entrance plane X from the trajectory of the central particle $P_o$, which again follows the optical axis of the system. However, the relative strength and/or positions of the magneto-optical elements is varied so that the particle $P_s$ follows a trajectory through the first bending magnet 12' and enters the centrally disposed quadrupole lens 10' at an eccentric location wherefore the magnetic field of the lens causes convergent deflection of the particle. The deflection is such that the particle $P_s$ crosses the optical axis as traversed by the central $P_o$ at a point shortly beyond the quadrupole lens 10'. After such particle crossover, the particle $P_s$ passes through the second bending magnet 14' and thereafter continues to diverge from the trajectory of the central orbit particle $P_o$ through and beyond such second bending magnet. More particularly, the precise trajectories are such that the condition is again satisfied that:

$$\int_x^y S(t)h(t)dt=0$$

With reference to FIG. 3B, a particle $P_c$ originally parallel to the central orbit particle $P_o$ is bent by the first deflecting magnet 12' so as to reach a radial crossover at the quadrupole lens 10' and thereafter passes through the second bending magnet 14' to emerge therefrom in parallelism with the central orbit particle $P_o$. The visually-apparent anti-symmetrical trajectores meet the second condition:

$$\int_x^y C(t)h(t)dt=0$$

and it accordingly follows that the conditions for achromatic beam deflection are again satisfied and the ultimate result as illustrated in FIG. 1 is obtained, although, as will be obvious, a slight change in the direction of the exit path will occur.

Figure 4A:
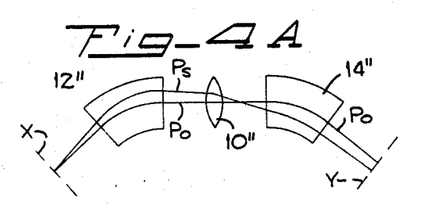
Figure 4B:
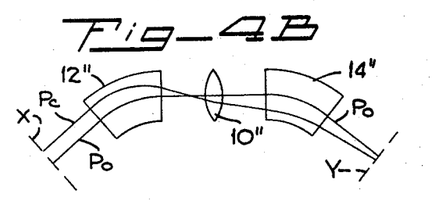

A third arangement for establishing the conditions for achromatic beam deflection is illustrated in FIGS. 4A and 4B, which arrangement is asymmetric in "C" and "S." Initially, as shown in FIG. 4A, a divergent particle $P_s$ passes through the first bending magnet 12'' and the quadrupole lens 10'' to reach a radial crossover relative to the central orbit particle $P_o$ at a point thereyond and thereafter passes through the second magnet 14'' to follow a final convergent path. As shown in FIG. 4B, a particle $P_c$ parallel to the central orbit particle $P_o$ passes through the first bending magnet 12'' and reaches a radial crossover immediately before entry into the central quadrupole lens 10''. After traversing the lens 10'' and the second bending magnet 14'', the particle $P_c$ then converges on the central orbit particle $P_o$. By appropriate choice of the magnetic field strength and the actual placement of the magnets, the two flux integral conditions described hereinabove can be established so that an achromatic beam deflection system as illustrated in FIG. 1 is obtained, with variation only in the direction of the exit path or trajectory of the non-monoenergetic particles.

Considering the foregoing description fo achromatic beam deflection by the exemplary arrangement illustrated in FIG. 1 and explained by reference to FIGS. 2A, 2B, 3A, 3B, 4A and 4B, the method of achromatic beam deflection can be seen to generally comprise subjecting the charged particles in the beam to a series of deflecting forces such that all monoenergetic particles following initially parallel paths are deflected by such forces conjointly to satisfy the condition that:

$$\int_x^y C(t)h(t)dt=0$$

and all monoenergetic particles following initially divergent paths emanating from a point in a predetermined entrance plane are deflected by all of the deflecting forces an amount to satisfy the condition that:

$$\int_x^y S(t)h(t)dt=0$$

As previously mentioned, it will be understood that the deflecting forces can be either magnetic, as illustrated by way of example in FIG. 1, or electric. Furthermore, while the system illustrated in FIG. 1 is symmetric, it will be obvious that an asymmetric arrangement of the forces can also be utilized so long as the two aforementioned conditions are fulfilled.

If one considers the arrangement of FIG. 1 specifically, the method then entails the steps of initially subjecting the incident particles to a dispersive deflecting element such as the bending magnet 12, thereafter subjecting the dispersed particles to a convergent focusing element such as the magnetic quadrupole lens 10 and finally subjecting the particles to a second dispersive element such as the bending magnet 14, the summation of the deflecting forces meeting the two flux-integral conditions as recited hereinabove to achieve achromatic deflection of the non-monoenergetic particles.

Additionally, by appropriate design and placement of the magneto-optical elements, a system can be chosen which will not only meet the requirements for achromatic beam deflection, but will also deflect a beam of initially parallel particles to a final deflected beam of emergent parallel particles. Such a system is illustrated, by way of example, in FIG. 5 wherein particles $P_3$ and $P_4$ of different energies enter the system along one path, are dispersed by a first bending magnet 20, are both deflected by a quadrupole lens 22 and thereafter are caused to move along convergent paths to and through a third bending magnet 24 and follow an identical emergent path, these trajectories being similar to those of the particles $P_1$ and $P_2$ through the system illustrated in FIG. 1.

Figure 5:
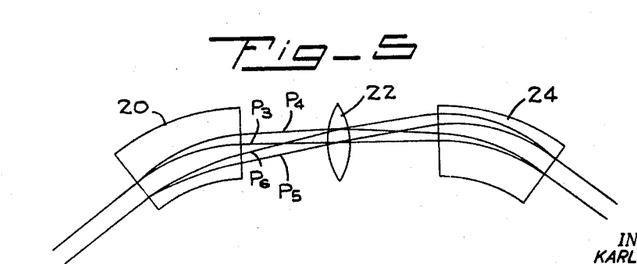
FIG. 5 is a dispersion ray diagram of the trajectories of non-monoenergetic particles in a system similar to that illustrated in FIG. 1 and arranged to deflect particles having incident parallel trajectories to final emergent particle trajectories that are also parallel and which meets the conditions for achromatic beam deflection.

The first bending magnet 20 is also entered by particles $P_5$ and $P_6$ traveling along a single entrance path which is disposed parallel to the entrance path of the particles $P_3$ and $P_4$. For illustrative purposes, the particle $P_5$ is stipulated as having the same energy as the particle $P_3$ and, in turn, the particle $P_6$ has the same energy or momentum as the particle $P_4$. Again, because of the different energies of the particles $P_5$ and $P_6$, they are dispersed as they traverse the first bending magnet 20 and subsequently enter the centrally disposed quadrupole lens 22 at different transverse positions. Since the particles $P_3$ and $P_5$ have the same energy or momentum, a crossover of the particle trajectories will be experienced at the central quadrupole lens 22, the situation being generally similar to that illustrated and described by reference to FIG. 2B. Similarly, particle $P_4$ has a trajectory which crosses over that of the particle $P_6$ at the central quadrupole lens 22. The particles $P_5$ and $P_6$ are deflected by the quadrupole lens 22 to have convergent trajectories as they move toward and through the second bending magnet 24 and finally emerge along a single exit path which is parallel to the exit path of the particles $P_3$ and $P_4$. However, it will be noted that because of the central crossover of the particle trajectories, a transposition of the output paths of the particles relative to their input paths will be experienced.

Figure 6:
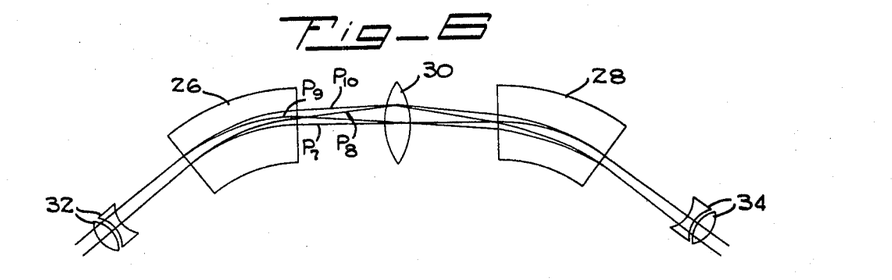
FIG. 6 is a dispersion ray diagram, constituting a system modified from that illustrated in FIG. 5, but also meeting the conditions for achromatic beam deflection and for deflecting or translating an incident beam of parallel particles to a final beam of parallel particles, regardless of the individual particle energies.

In certain instances, additional magneto-optical elements can be added to an achromatic beam deflection arrangement, such as shown in FIG. 1 or 5, to produce certain desired characteristics and/or advantages. More specifically, by the addition of a pair of quadrupole lenses before and after the achromatic beam deflection arrangement illustrated in FIG. 5, frequently advantageous variations in the design of the magnet system or the elements themselves can be achieved. As illustrated in FIG. 6, a pair of bending magnets 26 and 28 are symmetrically arranged on opposite sides of a central quadrupole lens 30 much in the fashion of the arrangement illustrated in FIGS. 1 and 5. Before the first bending magnet 26, a quadrupole lens pair 32 having a net convergent effect is positioned and a like quadrupole pair 34 is positioned beyond the second bending magnet 28, the two quadrupole pairs 32 and 34 being symmetrically positioned relative to the central quadrupole lens 30. When appropriately arranged, as will be discussed in detail hereinafter, the system illustrated in FIG. 6 is capable of providing achromatic beam deflection and also of transporting an initially parallel beam of particles to a final parallel beam after the fashion of the arrangement shown in FIG. 5. More particularly, two particles $P_7$ and $P_8$ of different energy enter the first quadrupole pair 32 along a predetermined path, and two additional particles $P_9$ and $P_{10}$ of different energy enter the first quadrupole pair along another path that is parallel to that of the particles $P_7$ and $P_8$. For purposes of illustration, the particles $P_7$ and $P_9$ have the same energy, while the particles $P_8$ and $P_{10}$ are of like energy. The net effect of the first quadrupole pair 32 is to provide for convergent trajectories of the joint paths of the particle pairs as they enter the first bending magnet 26. As the particles of different energy $P_7$ and $P_8$ traverse the first bending magnet 26, a dispersion is effected so that these particles emerge therefrom along divergent paths, and enter the centrally disposed quadrupole 30 at different transverse positions. In a similar fashion, particles $P_9$ and $P_{10}$ are dispersed by the first bending magnet 26 so that they too enter the centrally disposed quadrupole lens 30 at divergent positions. The trajectories of the particles $P_7$ and $P_9$ reach a crossover at the central quadrupole lens 30 and the particles $P_8$ and $P_{10}$ also have trajectories which cross over at the quadrupole lens 30. The effect of the centrally disposed quadrupole lens 30 is convergent, but is arranged so that the particles $P_7$ and $P_8$ emerging from the second bending magnet 28 follow one path and the particles $P_9$ and $P_{10}$ follow another path, the two paths being slightly divergent as the final quadrupole pair 34 is entered. The net effect of this final quadrupole pair 34 is convergent and the particle paths emerging therefrom are once again parallel so that the initial condition of parallelism is preserved, although again as in the case of the FIG. 5 arrangement, a transposition of the paths is experienced as a result of the central crossover of the particle trajectories.

Figure 7A:
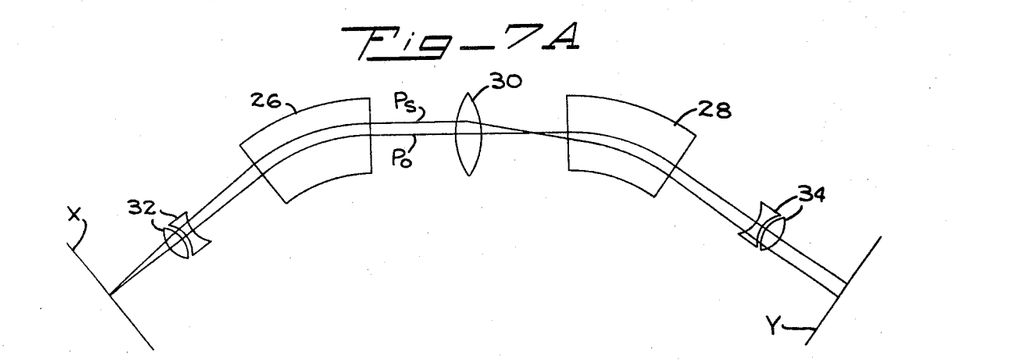
FIGS. 7A and 7B are radial ray diagrams of the trajectories of monoenergetic particles traversing the system shown in FIG. 6 to aid in explanation of the conditions for establishing achromatic beam deflection.

As was the case in the previously described arrangements, the results illustrated in FIG. 6 can be obtained through establishment of certain conditions or requirements relating only to the trajectories of monoenergetic particles through the system. Generally, the monoenergetic particle conditions are those defined by the previously discussed flux integrals and may be more easily understood by reference to FIGS. 7A and 7B. With particular reference to FIG. 7A, a central orbit particle $P_o$ passes along the optical axis of the entire system consisting of the initial quadrupole pair 32, the first bending magnet 26, the centrally-disposed quadrupole lens 30, the second bending magnet 28, and the second quadrupole pair 34. A second particle $P_s$ having the same energy or momentum as the orbit particle $P_o$ diverges from such central orbit particle at an object point located in an entrance plane X and thereafter initially traverses the first quadrupole pair 32 which decreases the divergent trajectory of the particle $P_s$ an amount such that the particle $P_s$ traverses the first bending magnet 26 and the centrally-disposed quadrupole lens 30 which is also a convergent lens to reach a crossover with the central orbit particle at a position between the central quadrupole lens 30 and the second bending magnet 28. Thereafter, the particle $P_s$ traverses the second bending magnet 28 and the final quadrupole pair 34 along a divergent path or trajectory arranged so that:

$$\int_x^y S(t)h(t)dt=0$$

Figure 7B:
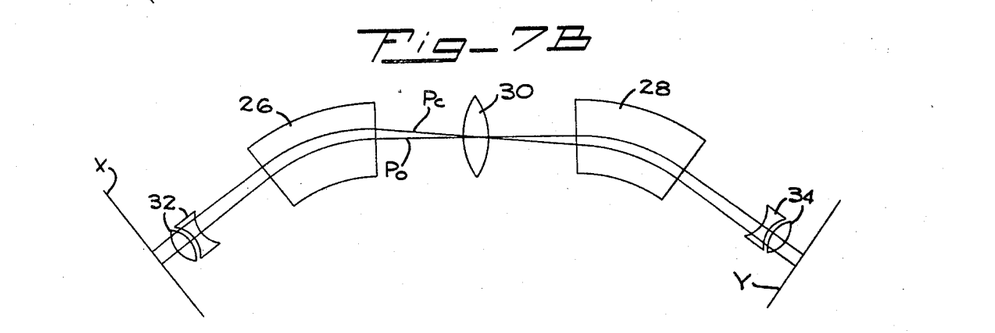

In FIG. 7B, the same central orbit particle $P_o$ traverses the optical axis of the system while another particle $P_c$ having the same energy as the central orbit particle enters the initial quadrupole pair 32 along a parallel trajectory or path, is caused to achieve a slightly convergent path by this first quadrupole pair 32, and thereafter passes through the first bending magnet 26 to arrive at a crossover with the central orbit particle $P_o$ at the axis of symmetry of the system, or in other words, at the centrally-disposed quadrupole lens 30. Thereafter, the particle $P_c$ diverges from the central orbit particle $P_o$, is deflected by the second bending magnet 28 so as to emerge along a trajectory that is slightly divergent from that of the central orbit particle whereupon the subsequent effect of the second quadrupole pair 34 is to reestablish the trajectory of the particle $P_c$ in parallelism with that of the central orbit particle $P_o$ as the particles emerge from this second quadrupole pair 34. As will be visually obvious from an inspection of FIG. 7B, the particle trajectories are anti-symmetric about the central quadrupole lens 30 so that:

$$\int_x^y C(t)h(t)dt=0$$

Accordingly, the two flux integral conditions are met to enable achievement of achromatic beam deflection and because of the anti-symmetric arrangement of the entering parallel particles, the deflection of an initially parallel beam to a finally parallel beam is also achieved. Since the quadrupole pairs 32 and 34 have a net convergent effect, their addition to the system illustrated in FIG. 5 enables either the strength of the bending magnets 26 and 28 to be lessened, or alternatively, the spacing between such bending magnets 26, 28 and the centrally disposed quadrupole lens 30 to be reduced. Such variation in magnet strength and spacing can obviously have advantages depending upon the particular requirements for a given installation. It will also be apparent that additional focusing elements can be added to an existent achromatic beam deflection system to meet many and varied requirements so long as the two described flux integral conditions are met.

Figure 8:
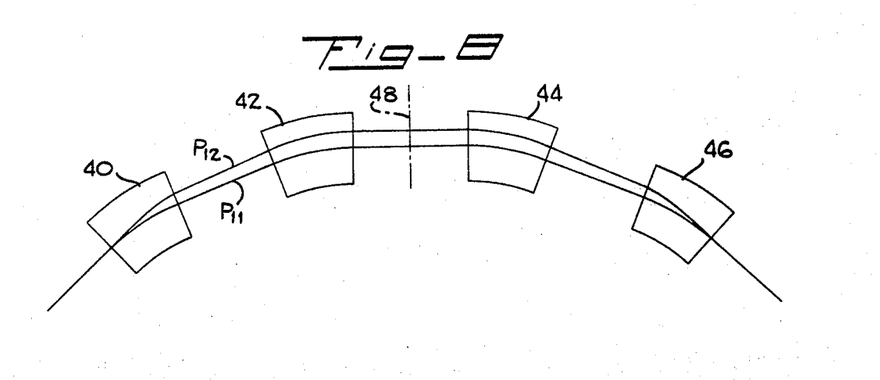
FIG. 8 is a dispersion ray diagram of an alternate system for achieving achromatic beam deflection of non-monoenergetic particles.

Yet other arrangements can be devised for effecting achromatic beam deflection, one such being illustrated in FIG. 8 where a series of four bending magnets 40, 42, 44 and 46 are arranged in series so as to successively deflect a charged particle in the same sense or direction. Preferably, all of the bending magnets 40, 42, 44 and 46 are identical in construction and are positioned as pairs in mirror symmetry about a central plane indicated at 48.

When so arranged and designed to meet the previously discussed flux integral conditions, two particles $P_{11}$ and $P_{12}$ having different energies but entering the system along a common path will have the trajectories illustrated in FIG. 8. Initially, the particles $P_{11}$ and $P_{12}$ are caused to disperse by the action of the first bending magnet 40 and follow divergent paths from such first bending magnet to the second bending magnet 42 wherein the additional bending force exerted on the particles $P_{11}$ and $P_{12}$ has an overall convergent effect so that the particles exit from the second bending magnet and pass through the plane of symmetry 48 in parallelism towards the third bending magnet 44. Thereafter, the particles $P_{11}$ and $P_{12}$ are subjected to the action of the third and fourth bending magnets 44, 46 which, being in mirror symmetry with the first two bending magnets 40 and 42, effect mirror symmetry of the particle trajectories so that the two particles emerge from the fourth bending magnet 46 along a common path. Thus, the resultant momentum dispersion of the non-monoenergetic particles $P_{11}$ and $P_{12}$ are parallel betwen the second and third magnets 42 and 44, and accordingly the spacing between these magnets is not critical and enables adjustment of the magnet positions on opposite sides of the plane of symmetry 48 so long as such symmetry is preserved. Consequently, space requirements of a particular installation can be readily met.

Figure 9A:
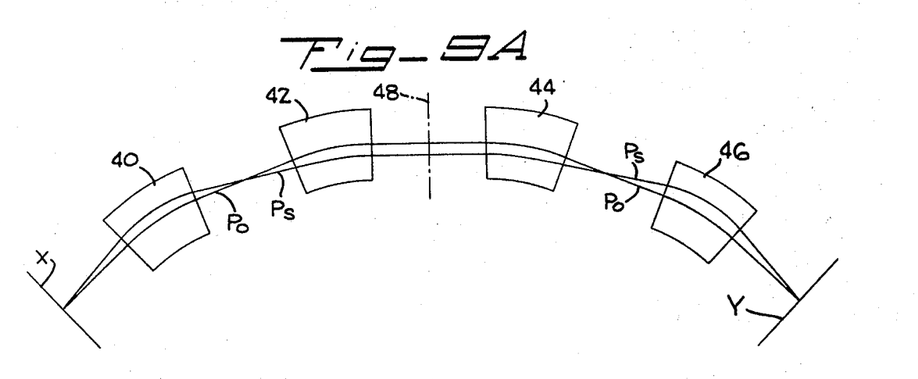
FIGS. 9A and 9B are radial ray diagrams of monoenergetic particles traversing the system of FIG. 8 again to assist in explanation of its achromatic beam deflection characteristics.

The mentioned flux integral conditions that must be satisfied to provide achromatic beam deflection in the FIG. 8 system can be explained by reference to FIGS. 9A and 9B wherein the trajectories of monoenergetic particles are illustrated. In FIG. 9A, a central orbit particle $P_o$ leaves an entrance plane X and passes along the optical axis of the system to an exit plane Y. A second particle $P_s$ diverges from the central orbit particle $P_o$ at a point in the entrance plane X and is deflected by the first bending magnet 40 an amount such that a radial crossover of the trajectories of the particles $P_o$ and $P_s$ is achieved between the first and second bending magnets 40 and 42. Thereafter, the particle $P_s$ is subjected to the deflecting force of the second bending magnet 42 which is arranged to provide for an emergent trajectory of the particle $P_c$ which is parallel to that of the central orbit particle $P_o$ between the secon dand third bending magnets 42 and 44. Thereafter, the third bending magnet 44 effects a deflection of the particle $P_s$ an amount such that another radial crossover of the trajectories of this particle and the central orbit particle $P_o$ is experienced between the third and fourth bending magnets 44 and 46. In turn, the fourth bending magnet 46 is arranged to deflect the particle $P_s$ so that its trajectory converges with the trajectory of the central orbit particle $P_o$ at a point in the exit plane Y. It will be apparent that the particle trajectories are symmetrical about the central plane of symmetry 48 and the first flux integral condition for achromatic beam deflection is achieved.

Figure 9B:
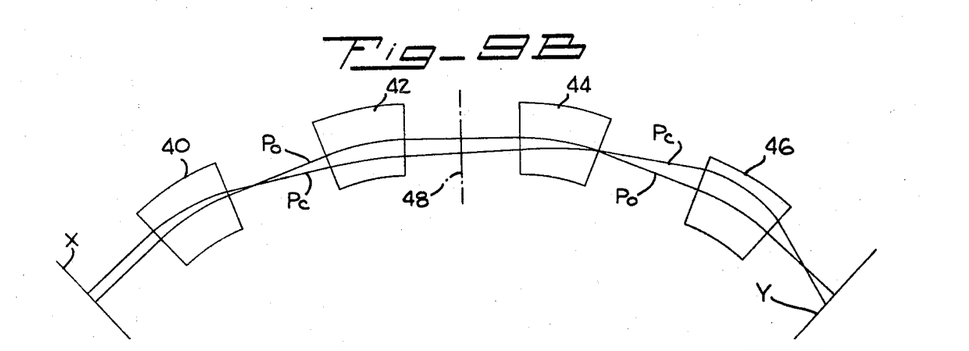

With reference to FIG. 9B, the trajectory of a central orbit particle $P_o$ from the entrance plane X to the exit plane Y along the optical axis of the FIG. 8 system is again illustrated, and the trajectory of a particle $P_c$ having the same energy as the central orbit particle $P_o$ has an illustrated trajectory which conjointly with that of the particle $P_o$ satisfies the second flux integral condition. More particularly, this particle $P_c$ enters the first bending magnet 40 in parallelism with the central orbit particle $P_o$ and is deflected by such first bending magnet an amount such that a radial crossover with the central orbit particle $P_o$ is achieved almost immediately after emergence from such first bending magnet. The particle $P_c$ is thereafter subjected to the action of the second bending magnet 42 which effects a deflection of this particle such that upon leaving the second bending magnet the particle $P_c$ follows a path which converges on the trajectory of the central orbit $P_o$. Subsequently, the particle $P_c$ is subjected to the action of the third bending magnet 44 and reaches a second radial crossover which may lie within such magnet to thereafter follow a divergent path relative to the central orbit particle trajectory between the third and fourth magnets 44 and 46. The final action of the fourth bending magnet 46 is then such as to effect a deflection of the particle $P_c$ an amount whereby another radial crossover is experienced prior to the arrival of the particles $P_o$ and $P_c$ at the exit plane Y. While not as easily discernible from an inspection of FIG. 9B, the summation of the enclosed flux, or in other words, the value of the flux integral expressing the second condition required for achieving achromatic beam deflection is again zero.

Figure 10:
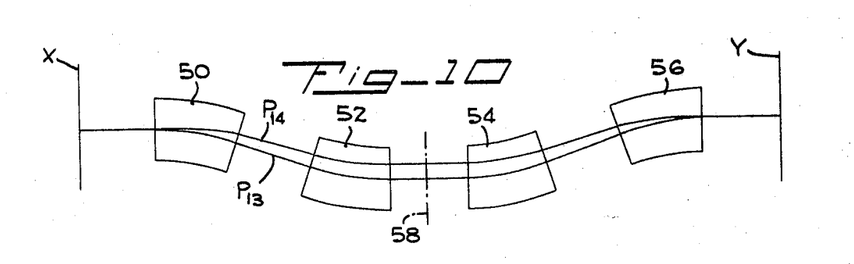
FIG. 10 is yet another dispersion ray diagram of a further achromatic beam deflection system.

In FIG. 10, yet an alternative system is illustrated which is capable of carrying out the method of the present invention and thus of achieving achromatic beam deflection. As shown, four like and serially-related bending magnets 50, 52, 54 and 56 are utilized, the first magnet 50 serving to deflect particles to the right, the second magnet 52 serving to deflect particles to the left, the third magnet 54 serving to deflect particles also to the left, and finally, the fourth magnet 56 serving to again deflect particles to the right. Thus, as will be apparent from an inspection of FIG. 10, the two pairs of magnets 50, 52 and 54, 56 are positioned in mirror symmetry about a central plane of symmetry indicated at 58. Two non-monoenergetic particles $P_{13}$ and $P_{14}$ entering the first bending magnet 50 along a common path are caused to diverge, are thereafter subjected to a slightly convergent effect of the second bending magnet 52 so as to leave such second magnet and pass to the third bending magnet 54 in parallelism. Subsequently traversing the third and fourth bending magnets 54 and 56, the particles $P_{13}$ and $P_{14}$ are bent in their trajectories so as to finally converge and follow a common output path and thus provide zero momentum dispersion.

Figure 11A:
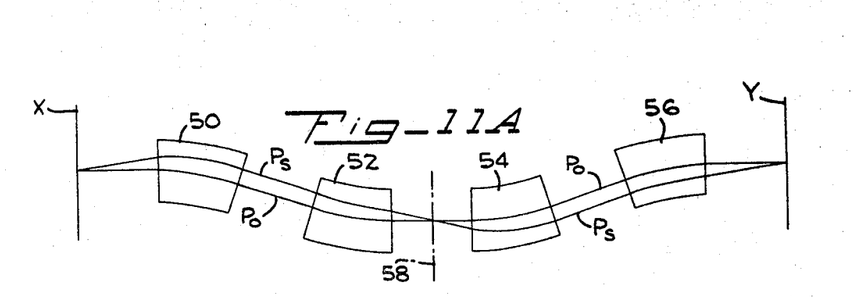
FIGS. 11A and 11B are radial ray diagrams of monoenergetic particles traversing the FIG. 10 system to illustrate the manner of achieving achromatic beam deflection.
Figure 11B:
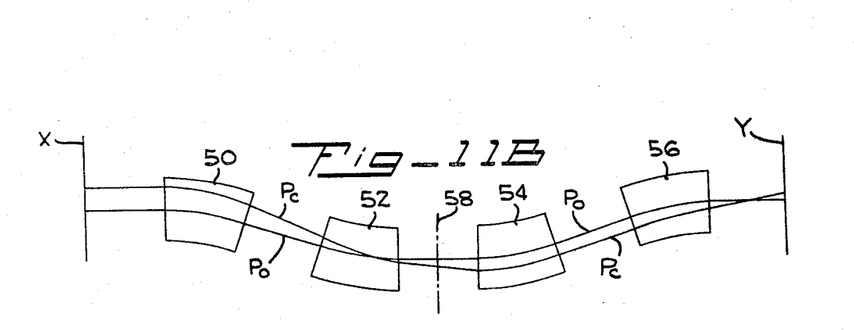

To provide achromatic beam deflection so that the mentioned zero momentum dispersion at the output of the system shown in FIG. 10 results, the four magnets 50, 52, 54 and 56 are arranged to provide for the trajectories of monoenergetic particles as illustrated in FIGS. 11A and 11B. Initially, with reference to FIG. 11A, a central orbit particle $P_o$ leaves an entrance plane X and passes along the optical axis of the entire system to an exit plane Y. In turn, a second particle of equal energy, $P_s$, diverges from the central orbit particle $P_o$ at a point in the entrance plane X to traverse the first and second bending magnets 50, 52 and be deflected thereby so that a radial crossover of the particle trajectories is experienced at the plane of symmetry 58 of the system. On the opposite side of this plane of symmetry, the trajectories of the orbit particle $P_o$ and the initially divergent $P_s$ are in antisymmetric relationship, and the trajectories of the particles extending through the two bending magnets 54 and 56 again converge to a point located in the exit plane Y of the system. The noted antisymmetric relationship of the trajectories of the particles $P_o$ and $P_s$ provide immediate visual evidence in FIG. 11A that the one flux integral condition is met.

With reference to FIG. 11B, a central orbit particle $P_o$ again passes along the optical axis of the same system from the entrance plane X to the exit plane Y, traversing, in turn, the fields of the four bending magnets 50, 52, 54 and 56. A second particle $P_c$, having the same energy as the central orbit particle $P_o$, leaves the entrance plane X and passes into the first bending magnet 50 along a trajectory that is parallel to that of the central orbit particle $P_o$. Thereafter, the action of the first two bending magnets 50, 52 is such as to effect a deflection of the particle $P_c$ so that its trajectory crosses that of the central orbit particle $P_o$ prior to arrival at the central plane of symmetry 58, and subsequent traversal of the other bending magnets 54 and 56 in turn effects a second radial crossover of the trajectories of the particles $P_o$ and $P_c$ prior to their arrival at the exit plane Y. The precise trajectories are such that the second flux integral condition relative to initially parallel particles is again satisfied to thus establish the requirements for achromatic beam deflection wherefore the result will be the trajectories of non-monoenergetic particles through the system as shown in FIG. 10.

It will be observed that all of the systems described are arranged in mirror symmetry, but it is to be explicity understood that as long as the two recited flux integral conditions are met to provide for achromatic beam deflection, any system, be it symmetric or not, is capable of carrying out the steps of the present method to effect achromatic beam deflection. Accordingly, the foregoing description of several embodiments of the invention is to be considered as purely exemplary, and not in a limiting sense; and the actual scope of the invention is to be indicated by reference to the appended claims.

What is claimed is:

1. A method for achromatically deflecting a beam of non-monoenergetic charged particles which comprises subjecting the charged particles to a series of deflecting forces such that all monoenergetic particles following initially parallel paths are deflected an amount by all of the deflecting forces to satisfy the condition that:

$$\int_x^y C(t)h(t)dt=0$$

and all monoenergetic particles following initially divergent paths emanating from a point in a predetermined entrance plane are deflected an amount by all of the deflecting forces to satisfy the additional condition that:

$$\int_x^y S(t)h(t)dt=0$$

$x$ is the entrance plane,
$y$ is the exit plane,
$t$ is the distance along the central trajectory of a particle $P_0$ from the object point in the plane $x$,
$h(t)$ is the curvature of a particle $P_0$ on the central orbit at position $t$,
$S(t)$ is the deviation from the central orbit of a particle $P_s$ at a position $t$ and having the same momentum as the central orbit particle $P_0$, and
$C(t)$ is the deviation from the central orbit of a particle $P_c$ at position $t$, where the orbit of such particle $P_c$ is parallel to the central orbit at the entrance plane $x$.

2. A method for achromatically deflecting a beam of non-monoenergetic charged particles according to claim 1 wherein said forces are symmetrically arranged relative to a central plane of symmetry.

3. A method for achromatically deflecting a beam of non-monoenergetic charged particles which comprises initially subjecting the charged particles to a first dispersive deflecting force, thereafter subjecting the dispersed particles to a convergent focusing force, and finally subjecting the particles to a second dispersive deflecting force, the summation of the series of forces being such that all monoenergetic particles following initially parallel paths are deflected an amount to satisfy the condition that:

$$\int_x^y C(t)h(t)dt=0$$

and all monoenergetic particles following initially divergent paths emanating from a point in a predetermined entrance plane are deflected an amount to satisfy the condition that:

$$\int_x^y S(t)h(t)dt=0$$

$x$ is the entrance plane,
$y$ is the exit plane,
$t$ is the distance along the central trajectory of a particle $P_0$ from the object point in the plane $x$,
$h(t)$ is the curvature of a particle $P_0$ on the central orbit at position $t$,
$S(t)$ is the deviation from the central orbit of a particle $P_s$ at a position $t$ and having the same momentum as the central orbit particle $P_0$, and
$C(t)$ is the deviation from the central orbit of a particle $P_c$ at position $t$, where the orbit of such particle $P_c$ is parallel to the central orbit at the entrance plane $x$.

4. A method for achromatically deflecting a beam of non-monoenergetic charged particles according to claim 3 wherein the first deflecting force is arranged to effect a radial crossover of initially divergent monoenergetic particles at the position where the convergent focusing force is applied.

5. A method for achromatically deflecting a beam of non-monoenergetic charged particles according to claim 3 wherein said first and second dispersive deflecting forces are substantially equal and are applied at positions symmetrically disposed on opposite sides of the position of application of the convergent focusing force.

6. A method for achromatically deflecting a beam of non-monoenergetic charged particles according to claim 3 wherein the first deflecting force is arranged to deflect initially parallel monoenergetic particles an amount such that a radial crossover is effected at the position of application of the convergent focusing force.

7. A method for achromatically deflecting a beam of non-monoenergetic charged particles according to claim 6 wherein said second dispersive deflecting force is arranged symmetrically relative to said first deflecting force on the opposite side of the position of application of the convergent focusing force whereby the initially parallel monoenergetic particles follow finally parallel paths after being subjected to all of the forces.

8. A method for achromatically deflecting a beam of non-monoenergetic charged particles which comprises initially subjecting the incident particles to a convergent focusing force, thereafter subjecting the particles to a dispersive deflecting force, subsequently subjecting the particles to a second convergent focusing force, thereafter subjecting the particles to a second dispersive deflecting force, an finally subjecting the particles to a third convergent focusing force, the summation of the series of forces being such that all monoenergetic particles following initially parallel paths are deflected an amount to satisfy the condition that:

$$\int_x^y C(t)h(t)dt=0$$

and all monoenergetic particles following initially divergent paths emanating from a point in a predetermined entrance plane are deflected an amount to satisfy the condition that:

$$\int_x^y S(t)h(t)dt=0$$

$x$ is the entrance plane,
$y$ is the exit plane,
$t$ is the distance along the central trajectory of a particle $P_0$ from the object point in the plane $x$,
$h(t)$ is the curvature of a particle $P_0$ on the central orbit at position $t$,
$S(t)$ is the deviation from the central orbit of a particle $P_s$ at a position $t$ and having the same momentum as the central orbit particle $P_0$, and
$C(t)$ is the deviation from the central orbit of a particle $P_c$ at position $t$, where the orbit of such particle $P_c$ is parallel to the central orbit at the entrance plane $x$.

9. A method for achromatically deflecting a beam of non-monoenergetic charged particles according to claim 8 wherein the second convergent focusing force is applied at a plane of symmetry located between the positions of application of the first convergent focusing force and the first deflecting force on the one hand and the second dispersive deflecting force and the final convergent focusing force on the other hand.

10. A method for achromatically deflecting a beam of non-monoenergetic charged particles according to claim 9 wherein initially parallel monoenergetic particles reach a radial crossover at the plane of symmetry whereby they emerge from the series of forces along parallel paths.

11. A method for achromatically deflecting a beam of non-monoenergetic charged particles which comprises subjecting the charged particles to a series of four dispersive deflecting forces such that all monoenergetic particles following initially parallel paths are deflected an amount by all of the dispersive deflecting forces to satisfy the condition that:

$$\int_x^y C(t)h(t)dt=0$$

and all monoenergetic particles following initially divergent paths emanating from a point in a predetermined entrance plane are deflected an amount by all of the deflecting forces to satisfy the condition that:

$$\int_x^y S(t)h(t)dt=0$$

$x$ is the entrance plane,
$y$ is the exit plane,
$t$ is the distance along the central trajectory of a particle $P_o$ from the object point in the plane $x$,
$h(t)$ is the curvature of a particle $P_o$ on the central orbit at position $t$,
$S(t)$ is the deviation from the central orbit of a particle $P_s$ at a position $t$ and having the same momentum as the central orbit particle $P_o$, and
$C(t)$ is the deviation from the central orbit of a particle $P_c$ at position $t$, where the orbit of such particle $P_c$ is parallel to the central orbit at the entrance plane $x$.

12. A method for achromatically deflecting a beam of non-monoenergetic charged particles according to claim 11 wherein all of the deflecting forces are arranged to deflect particles in the same direction.

13. A method for achromatically deflecting a beam of non-monoenergetic charged particles according to claim 11 wherein the four dispersive deflecting forces are arranged in symmetrical like pairs on opposite sides of a plane of symmetry.

14. A method for achromatically deflecting a beam of non-monoenergetic charged particles according to claim 11 wherein said four dispersive deflecting forces are arranged in order to deflect the charged particles initially in one direction, then in the opposite direction, then in the opposite direction again, and finally in the initial direction again.

15. Apparatus for achromatically deflecting a beam of non-monoenergetic charged particles which comprises a convergent magnetic lens, and a pair of bending magnets positioned respectively on opposite sides of said lens so the charged particles can successively traverse the three magnetic elements, the summation of the forces produced by said elements being such that all monoenergetic particles following initially parallel paths are deflected an amount to satisfy the condition that:

$$\int_x^y C(t)h(t)dt=0$$

and all monoenergetic particles following initially divergent paths emanating from a point in a predetermined entrance plane are deflected an amount to satisfy the additional condition that:

$$\int_x^y S(t)h(t)dt=0$$

$x$ is the entrance plane,
$y$ is the exit plane,
$t$ is the distance along the central trajectory of a particle $P_o$ from the object point in the plane $x$,
$h(t)$ is the curvature of a particle $P_o$ on the central orbit at position $t$,
$S(t)$ is the deviation from the central orbit of a particle $P_s$ at a position $t$ and having the same momentum as the central orbit particle $P_o$, and
$C(t)$ is the deviation from the central orbit of a particle $P_c$ at position $t$, where the orbit of such particle $P_c$ is parallel to the central orbit at the entrance plane $x$.

16. Apparatus for achromatically deflecting a beam of non-monoenergetic charged particles according to claim 15 wherein said bending magnets are identical and are symmetrically disposed on opposite sides of said magnetic lens.

17. Apparatus for achromatically deflecting a beam of non-monoenergetic charged particles according to claim 15 which comprises a pair of convergent magnetic focusing lenses arranged on opposite sides of said two bending magnets and said central lens conjointly.

18. Apparatus for achromatically deflecting a beam of non-monoenergetic charged particles which comprises four bending magnets arranged in series for traversal successively by the charged particles, said bending magnets being arranged in like, symmetrical pairs on opposite sides of a central plane of symmetry, the summation of the forces produced by said elements being such that all monoenergetic particles following initially parallel paths are deflected an amount to satisfy the condition that:

$$\int_x^y C(t)h(t)dt=0$$

and all monoenergetic particles following initially divergent paths emanating from a point in a predetermined entrance plane are deflected an amount to satisfy the additional condition that:

$$\int_x^y S(t)h(t)dt=0$$

$x$ is the entrance plane,
$y$ is the exit plane,
$t$ is the distance along the central trajectory of a particle $P_o$ from the object point in the plane $x$,
$h(t)$ is the curvature of a particle $P_o$ on the central orbit at position $t$,
$S(t)$ is the deviation from the central orbit of a particle $P_s$ at a position $t$ and having the same momentum as the central orbit particle $P_o$, and
$C(t)$ is the deviation from the central orbit of a particle $P_c$ at position $t$, where the orbit of such particle $P_c$ is parallel to the central orbit at the entrance plane $x$.

19. Apparatus for achromatically deflecting a beam of non-monoenergetic charged particles according to claim 18 wherein said bending magnets are all arranged to deflect particles in the same sense.

20. Apparatus for achromatically deflecting a beam of non-monoenergetic charged particles according to claim 18 wherein said bending magnets are arranged to deflect particles first in one sense, then in a second sense, thereafter in the second sense again, and finally in the first sense again.

References Cited
UNITED STATES PATENTS
3,031,596  4/1962  Leboutet et al. ______ 313—84 X
3,056,023  9/1962  Marshall _________ 313—84 X
3,202,817  8/1965  Belbeock __________ 250—41.9

OTHER REFERENCES
Publications and reports by the staff of Accelerator Branch Radiation Physics Division 1949–Present, 24 pp.

Internal Report, Electron Beam Switching System for Linac, by Samuel Penner, Jan. 7, 1959, 18 pp.

Nat. Bur. of Stand. Report 6555, A Proposal for a High-Intensity Electron Accelerator, 28 pp.

HERMAN KARL SAALBACH, *Primary Examiner.*

S. CHATMON, JR., *Assistant Examiner.*